Nov. 30, 1948. C. S. SELTZER 2,454,948
ELECTRIC RESISTANCE SEAM WELDING APPARATUS
Filed Sept. 15, 1944 4 Sheets-Sheet 3

Inventor
CLIFFORD S. SELTZER
By Francis J. Klempay
Attorney

Nov. 30, 1948.  C. S. SELTZER  2,454,948
ELECTRIC RESISTANCE SEAM WELDING APPARATUS
Filed Sept. 15, 1944  4 Sheets-Sheet 4

Inventor
CLIFFORD S. SELTZER
By Francis J. Klempay
Attorney

Patented Nov. 30, 1948

2,454,948

UNITED STATES PATENT OFFICE 2,454,948

ELECTRIC RESISTANCE SEAM WELDING APPARATUS

Clifford S. Seltzer, Warren, Ohio, assignor to The Taylor-Winfield Corporation, Warren, Ohio, a corporation of Ohio Application September 15, 1944, Serial No. 554,324

11 Claims. (Cl. 219—6)

This invention relates to electric resistance seam welding apparatus and more particularly to apparatus of this nature which is operative to weld side seams in tubular bodies such as, for example, tubular metal container bodies. The primary object of the invention is the provision, in seam welding apparatus of the character employed to weld the side seams of tubular metallic bodies, of improved means to support, move, and guide the stock pieces relative to the welding throat of the apparatus and of improved welding apparatus whereby improved and more consistent welding results are attained particularly in the adaptation of the principles of the invention to high-speed automatic equipment such as metal container body makers.

A more specific object of the invention is the provision, in an automatic electric resistance seam welder of the type operative to weld the side seams of tubular metallic bodies, of improved anti-friction supporting and guiding means for the stock pieces to be welded whereby the same may be readily moved through the welding throat of the apparatus without injury even though the same is formed of thin gauge stock and whereby the stock pieces are maintained in accurate alignment with respect to the welding wheels employed during the passage of the stock pieces through the welding throat of the apparatus.

Another object of the invention is the provision, in an electric resistance seam welder for welding the side seams of tubular metallic bodies, of an improved arrangement for propelling the successive bodies to be welded over the welding horn of the apparatus and past the welding station of the apparatus. Other objects of the invention include the provision of improved arrangements for driving and guiding the welding wheels in electric resistance seam welders for welding the side seams of tubular bodies and providing for the changing over of the apparatus to weld bodies of different dimensions.

The above and other objects and advantages of the invention will become apparent upon consideration of the following detailed specification and the accompanying drawing wherein there is illustrated a preferred embodiment of the invention.

Figure 2:
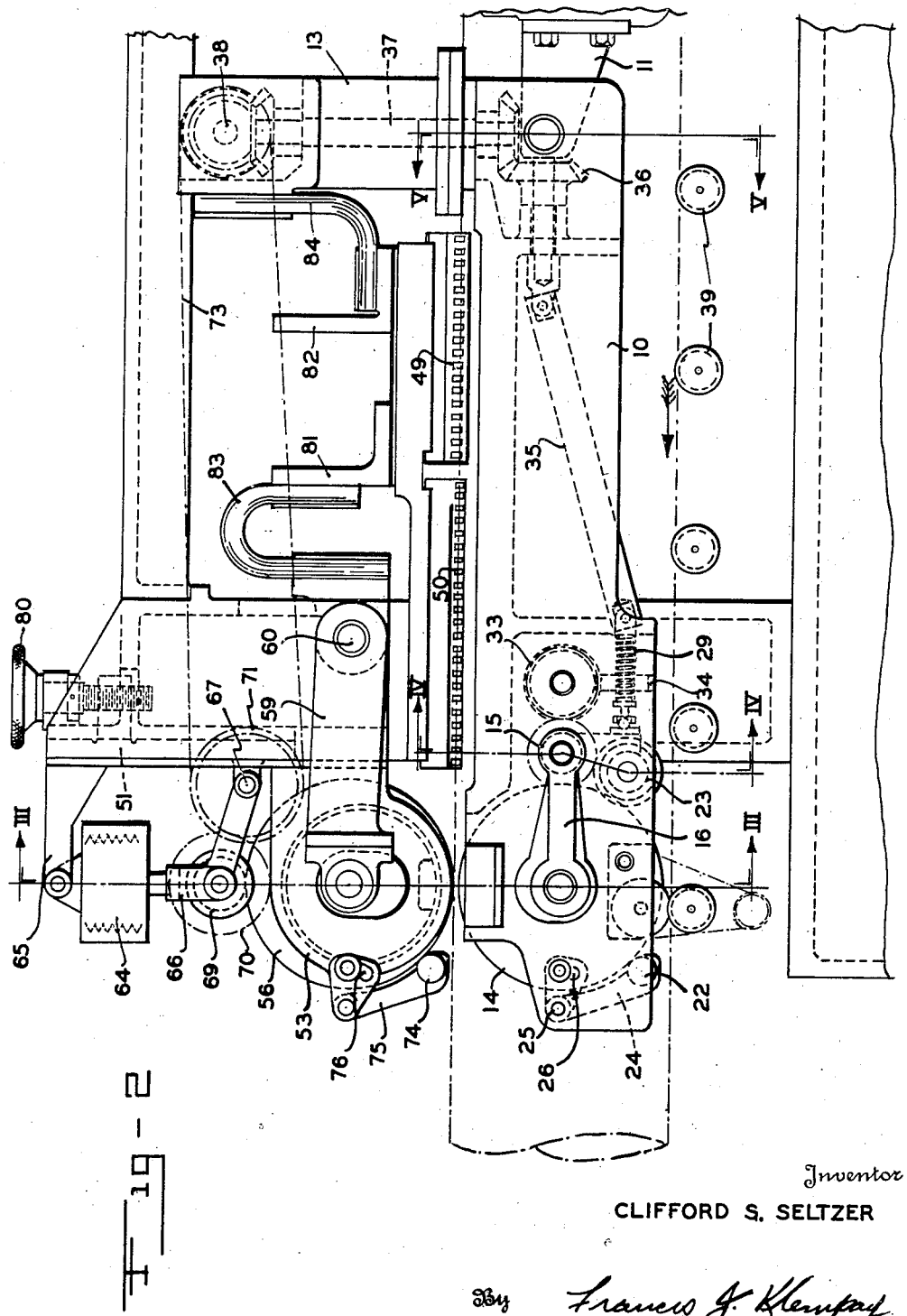
Figure 2 is a side elevation of the apparatus of Figure 1.
Figure 3:
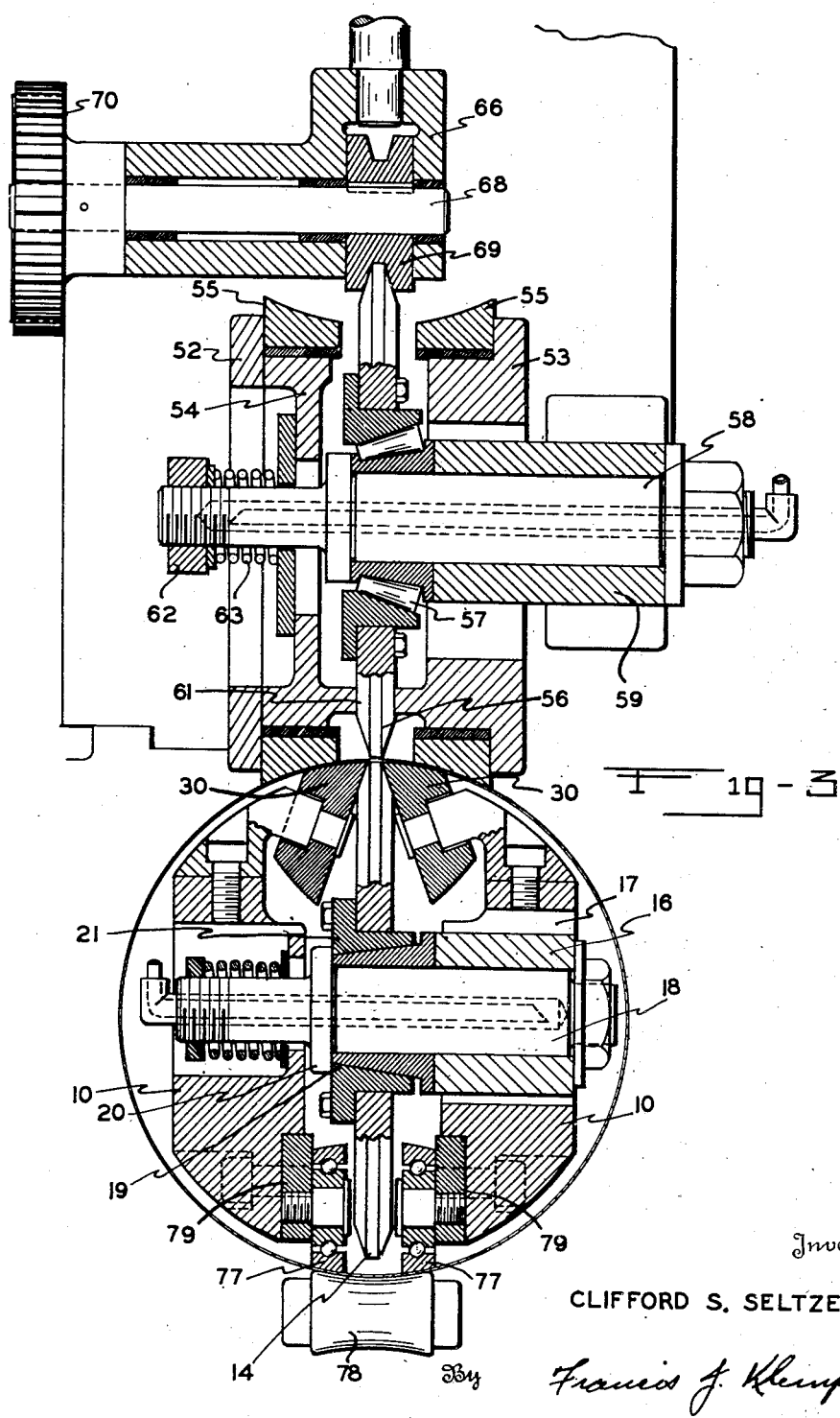
Figure 4:
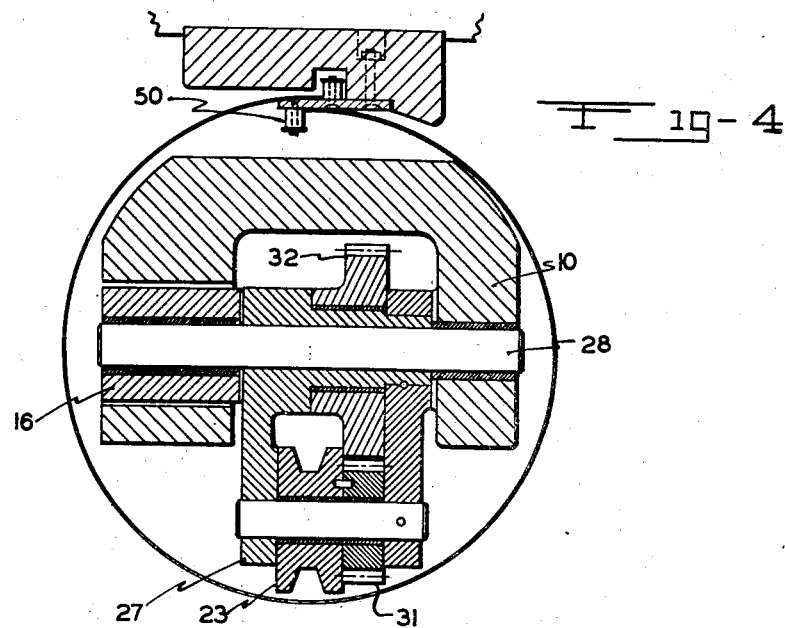
Figure 5:
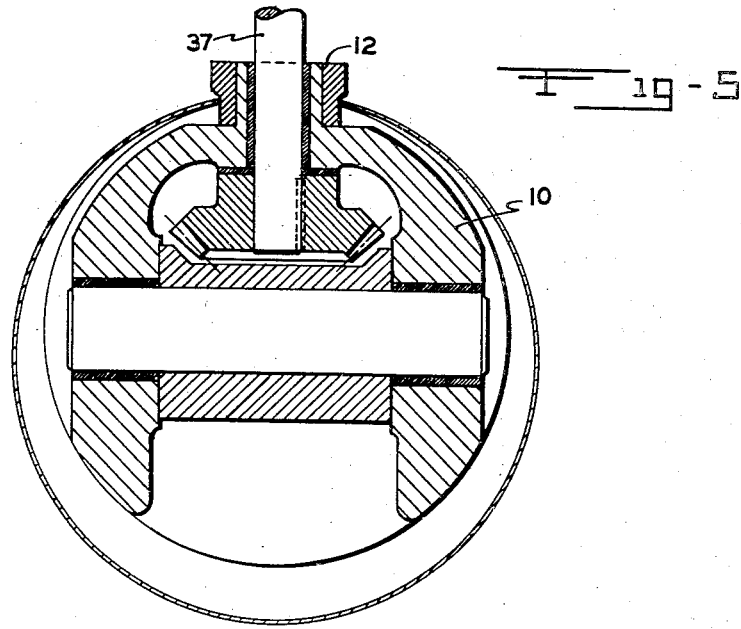

Figures 3, 4 and 5 are transverse sectional views taken along the lines 3—3, 4—4, and 5—5, respectively, of Figure 2.

Referring to the drawing, numeral 10 designates the welding horn of the apparatus which, in accordance with usual practice, is formed of copper alloy to give the required strength and current conductive characteristics. The leading end of horn 10 is carried by a bracket 11 which is adjustably mounted on a frame member of the forming device of the complete apparatus as will be understood. Horn 10 is provided with an integral upwardly extending web 12 (Figure 5) which is rigidly connected at its upper end with a housing 13 also constructed of material having good current conducting characteristics. The opposite end of horn 10 is bifurcated to rotatably receive a welding wheel electrode 14 the mounting and guiding of which will now be described.

Referring to Figures 2 and 3 the body of the horn 10 is bored transversely to receive a current conductive bushing 15 in which is journaled the semi-cylindrical end of an arm 16 which is movable in an opening 17 formed in the side wall of the horn 10. Extending through the opposite or free end of the arm 16 is a pin 18 having a bore therein for the circulation of cooling fluid and having an integral shoulder 20 for clamping a tapered bushing 19 against the side edge of the free end of the arm 16. Shoulder 20 also restrains axial movement of a second tapered bushing 21 which fits over bushing 19 and which is provided with an integral flange rigidly bolted to the wheel 14. Thus the wheel 14 is journaled on the free end of the arm 16 and can float up and down upon pivotal movement of the arm 16 as will be understood. Wheel 14 is guided and held in upper position by a guide roll 22 and by a circumferentially grooved drive roll 23. The first of these is journaled in the lower end of an arm 24 which is pivotally mounted on the horn 10 at 25 and which is provided with means 26 to retain it in adjusted position. The drive roll 23 is journaled in an arm 27 (Figure 4) which is mounted for rotation on a pin 28 passing axially through the center of the semi-cylindrical end of the arm 16. A compression spring 29 acting against the lower end of the arm 27 maintains the wheel 23 in pressure contact with the outer periphery of the welding wheel 14 thereby urging wheel 14 into engagement with the guide roller 22 and to upper position. Upward movement of the wheel 14 is restrained by a pair of convergently related supporting and guiding rolls 30 (Figure 3) which are rotatably mounted on inwardly and downwardly projecting studs formed on the bifurcations of the horn 10. As shown in Figure 3 the converging inner plane faces of the roller 30 engage the tapering side edges of the wheel 14 to limit the extent of upward movement of this welding wheel and to provide a highly efficient and anti-friction guide for the welding portion of the same, it being observed that the rollers 30 will rotate along with the wheel 14 during operation of the apparatus. Further, the rollers 30 aid materially in maintaining the proper peripheral contour of the welding wheel and, in addition, provide an anti-friction support at the welding area for the bodies to be welded. For this latter purpose the peripheral surfaces of the rollers 30 are curved to coincide generally with the transverse curvature of the stock being welded, all as clearly shown in Figure 3.

Welding wheel electrode 14 is driven by the circumferentially grooved drive wheel 23 which is keyed to a gear 31 which in turn meshes with a gear 32 (Figure 4) journaled for rotation about the axis of the pin 26. Referring to Figure 2 gear 32 is engaged by a gear 33 which in turn is driven by a gear 34 coupled with a drive shaft 35. All these parts are mounted within the body of the horn 10. Shaft 35 is driven through bevel gears 36 from a shaft 37 which extends up through the web 12 of the horn 10 and into the housing 13. A primary drive shaft 38 is provided for rotating shaft 37 and for synchronously driving the outer welding wheel of the assembly in a manner to be hereinafter described.

Figure 1:
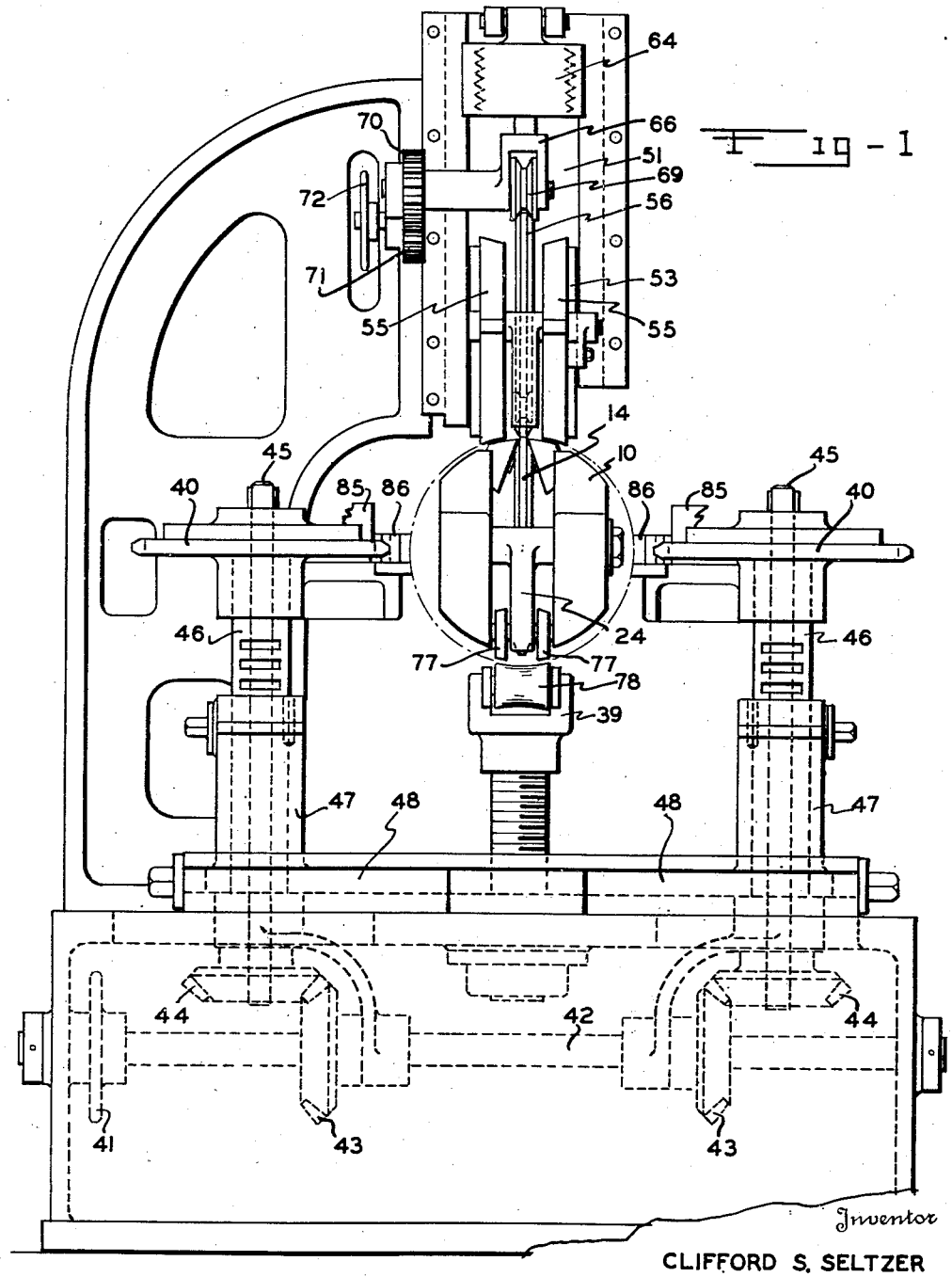
Figure 1 is an end elevation of electric resistance seam welding apparatus constructed in accordance with the principles of the invention.

As is well understood in the forming and welding art, particularly in the can making art, it is common practice to feed the stock directly from the forming apparatus or body makers directly to the welding station and in the presently illustrated apparatus this is accomplished by a roller conveyor 39 acting in conjunction with a pair of endless propelling chains, one on either side of the path of travel of the stock pieces, and each entrained over a pair of longitudinally spaced but horizontally disposed sprockets 40. Referring to Figure 1, the sprockets 40 shown is the leading sprocket of each side pair and these are driven in opposite directions from a drive sprocket 41 through a transversely extending shaft 42 and bevel gears 43 having driving connection with gears 44 keyed to shafts 45 which in turn are feathered to sprockets 40. Sprockets 40 are rotatably mounted on pedestals 46 which may be adjusted inwardly and outwardly of sockets 47 projecting upwardly from blocks 48 which are transversely slideable in the frame of the machine. Also as indicated in Figure 1 the conveyor 39 is readily adjustable vertically so that the same stock conveying and propelling apparatus may be utilized for bodies of varying diameters as will be understood. To handle tubular bodies of larger diameter the conveyor 39 is adjusted downwardly and the sprockets 40 are moved outwardly and downwardly, the latter adjustment being desirable to position the above mentioned propelling chains in the horizontal plane passing through the longitudinal axis of the tubular bodies.

In the apparatus illustrated herein the formed tubular body members enter onto the horn 10 at the right and thereof as viewed in Figure 2 with the side edges of the open cleft passing on opposite sides of the web 12 of the horn 10 as shown in Figure 5. Spaced longitudinally behind web 12 is a series of transversely and longitudinally spaced rollers 49 which are engaged by the cleft edges to hold the cleft opened and to provide an anti-friction guide for the longitudinal movement of the tubular stock pieces. Longitudinally spaced behind the gauge 49 is a Z-bar 50 also made up of a double series of longitudinally spaced rollers as clearly shown in Figure 4. As is well understood in the art the purpose of gauge bars of this general nature is to overlap the edges of the stock of the tubular body members preparatory to the welding operations. Slideably mounted in the suitable vertical guideways formed in the principal frame of the apparatus is a carrier 51 having a pair of forwardly extending but transversely spaced lugs or ears 52 and 53, the latter of which is provided with an integral flange, as shown, while the former has attached to it an annular member 54. The annular member 54 as well as a portion of the projection 53 are provided with cylindrical bearing surfaces to rotatably mount the clamping rings 55. As shown, these rings 55 have convex outer surfaces to engage and fit closely the outer surfaces of the bodies being welded. Moreover, as shown in Figure 3, the rings 55 overlie, at least partially, the rollers 30 so that the stock may be rigidly clamped and guided during the welding operation. In lap seam welding where the extent of overlap is limited, as in can making for example, the action of the welding wheels has a tendency to shift the upper layer of stock laterally which is objectionable in that it varies the width of the wheel line and in the case of can making varies the diameter of the body. This slippage of the stock is prevented by the clamping and guiding action of the rollers 30 and rings 55. It should be observed that the endwise thrust applied to the rollers 30 by the rings 55 is opposed in large measure by the interengagement of the rollers 30 with the welding wheel 14.

Floatingly mounted between the parts 53 and 54 is the exterior welding wheel electrode 56 which is, by means of a tapered roller bearing 57 journaled on a spindle 58 which in turn is rigidly mounted in the outer free end of a current conductive arm 59 which is pivotally mounted on the principal frame of the apparatus at 60. The spindle 58, as in the case of the spindle 18, is provided with a suitable bore or passage for the circulation therethrough of cooling fluid and to provide for the vertical movement of the spindle and welding wheel members 53 and 54 are each provided with vertically elongated openings to receive the spindle. Wheel 56 is constrained against axial movement by lugs 61 extending inwardly from the inner faces of the parts 53 and 54. It will be understood that in practice a number of such lugs, circumferentially spaced, will be provided. The pressure loading of the bearing 57 and consequently the conductivity of the bearing is determined by the setting of a nut 62 which in turn controls the force exerted by a spring 63 in a direction tending to tighten the bearing. It should be understood, of course, that if desired the anti-friction bearing 57 may be eliminated and simple tapered bushings employed to rotatably mount the wheel 56 in the manner employed in connection with the interior wheel 14.

Welding force is applied by a bellows 64 which is supplied with fluid pressure through suitable instrumentalities, not shown. The upper end of the bellows 64 is pivotally connected to a bracket 65 carried by the carrier 51 while the lower end is connected to an arm 66 which is pivotally connected to the slide at 67. Keyed to a shaft 68 journaled in the arm 66 is a circumferentially grooved drive wheel 69 which has pressure engagement with the outer periphery of the welding wheel 56 on the side thereof diametrically opposite the zone of weld. By varying the pressure in the bellows 64 the welding force transmitted to the wheels 69 and 56 may be readily varied as will be understood. Shaft 68 carries a gear 70 which is meshed with a driven gear 71 mounted for rotation about an axis coincident with the axis of rotation of the arm 66. Gear 71 is driven by a sprocket 72 which is connected with the primary drive shaft 38 by means of a sprocket on this shaft and a drive chain 73. Inasmuch as the drive wheels 23 and 69 are both driven from a common shaft their peripheral speeds can be made equal and will remain equal during operation of the apparatus. Thus the peripheral speeds of the welding wheels 14 and 56 is synchronized and remains synchronized regardless of any unequalness in the wear of these two electrodes.

Wheel electrode 56 is further guided by a wheel 74 which is journaled in an arm 75 pivotally connected to the member 53, an adjustment 76 being provided to vary the radial position of the wheel 74. To support the electrode end of the welding horn 10 and to oppose the welding force exerted therethrough by the bellows 64 I provide a pair of anti-frictionally mounted rings 77 the outer peripheries of which are curved complementary to the curvature of the tubular body being welded and to the curvature of a conveyor roll 78 which is positioned directly below the rings 77. To facilitate adjustment of the apparatus to handle tubular bodies of a different diameter the rings 77 are rotatably mounted on pieces 79 which are detachably secured to the lower portions of the bifurcations of the horn 10. Thus, in the case of larger diametered bodies the pieces 79 would be of greater vertical dimension as will be understood. Slide 51 may be adjusted vertically by a thumb screw 80 the adjustment of which can determine the pressure exerted by the rings 55 but the welding force can only be controlled by changing the pressure of the fluid furnished the bellows 64. Welding current is furnished from the supply terminals 81 and 82, the former of which is electrically connected to the bracket mounting the conductive arm 59 by means of a flexible band 83 while the latter is electrically connected to the housing 13 by means of a band 84. As explained above, the electrical connection to the upper wheel electrode is through arm 59 while the connection to the interior wheel electrode is through housing 13, horn 10, and arm 16.

It should now be apparent that I have provided improved welding apparatus which accomplishes the objects initially set out. By means of the anti-frictional support and guidance of the successive moving tubular bodies I am enabled to satisfactorily side seam weld such bodies while the same continue along their path in uninterrupted movement. Once the bodies pass the web 12 of the horn 10 they are supported and guided substantially entirely by anti-friction devices including the rollers of the conveyor 39, the rollers of the spacing and Z-guides 49 and 50, respectively, interior rollers 30 and 77, and exterior rings 55. In this manner the stock can be moved, aligned, and satisfactorily welded notwithstanding its thinness of gauge and its limited extent of overlap. It should be observed that since the Z gauge 50 extends up close to the welding throat and since the guide rings 55 are necessarily retained in accurately aligned positions the bodies have no tendency to twist or cant during the welding operation. In this connection, the guide wheels 22 and 74 are of especial utility, particularly if they are grooved circumferentially, since their action tends to maintain the two welding wheel electrodes rotating in a common plane which includes the axis of movement of the tubular bodies being welded.

At the welding station the final diameter of the tubular body is sized automatically by action of the endless chains which are entrained over the sprockets 40. As shown more fully in my co-pending application Serial No. 561,013 filed Oct. 3, 1944, now U. S. Patent No. 2,432,490, dated December 9, 1947, side guides 85 are provided adjacent the paths of movement of the inner horizontal reaches of the chains 86 which limit and determine the spread of these reaches and consequently determine the transverse interval between the chains. Since the chains are in intimate contact with the outer surface of the metallic bodies the diameters of the bodies in this horizontal direction are consequently constrained and determined. The diameters in a vertical direction are, of course, determined by the vertical interval between the top of the rollers 30 and the bottom of the rollers 77 and the final result of the arrangement is that the diameter of the tubular members at the point of weld is kept within reasonably close tolerances.

An important aspect of the present invention is that the welding of successive tubular bodies may be accomplished without reciprocation of any part which reciprocation has heretofore deterred from the speed of operation and consistency of results in automatic welding equipment of the kind in which the principles of the present invention are of especial applicability.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In apparatus for side seam welding of tubular can bodies moving in succession along a pre-determined path the combination of a welding horn of current conductive material positioned in said path and onto which pre-formed but un-welded can bodies are moved, a welding wheel electrode journaled in the rear end portion of said horn and adapted to have rolling contact with the inner surface of the can bodies as the latter traverse said horn, means anchoring said horn against longitudinal movement comprising a current-conductive support connected to and extending radially outward of the opposite end of said horn, means to propel can bodies to be welded onto and along said horn in succession with the unwelded longitudinal edges thereof passing on opposite sides of said support, an external welding wheel electrode opposing said first mentioned welding wheel electrode, means to rotate and apply welding pressure through said external wheel electrode, and means to rotate said first mentioned wheel electrode comprising a driving shaft extending through said support radially into said horn.

2. In apparatus for side seam welding of tubular bodies having a welding horn to receive said bodies and cooperating internal and external welding wheel electrodes, means mounting said internal electrode on said horn comprising an arm pivotally mounted on said horn for movement in a vertical plane extending longitudinally of said horn, said internal electrode being rotatably carried by the free end of said arm, and rotatable means engaging the peripheral portions of said internal electrode to maintain said internal electrode in proper welding position.

3. Apparatus according to claim 2 further characterized in that said last mentioned means comprises a pair of rollers journaled on said horn for rotation about outwardly and upwardly extending axes, said rollers having inwardly disposed end surfaces for engaging opposite side edges of the peripheral portion of said internal electrode and longitudinally curved peripheral surfaces for engaging the inner surface of the bodies being welded.

4. In apparatus for side seam welding of tubular bodies having a welding horn to receive said bodies and cooperating internal and external welding wheel electrodes, means mounting said internal electrode on said horn for rotation about an axis extending transversely of the longitudinal axis of said horn, and means to guide the peripheral portion of said internal wheel electrode at the welding zone comprising a pair of rollers journaled on said horn for rotation about outwardly and upwardly extending axes, said rollers having inwardly disposed end surfaces for engaging opposite side edges of the said peripheral portion of said internal electrode and longitudinally curved peripheral surfaces for engaging the inner surface of the bodies being welded.

5. In apparatus for side seam welding of tubular bodies having a welding horn to receive said bodies and cooperating internal and external welding wheel electrodes, means floatingly mounting said internal electrode on said horn for rotation about axes extending transversely of the longitudinal axis of said horn, and means engaging the peripheral portion of said internal wheel to guide the same for rotation in a predetermined plane and to maintain the body engaging portion of the periphery of the same in predetermined position.

6. In apparatus for side seam welding of tubular bodies having a welding horn to receive said bodies and cooperating internal and external welding wheel electrodes, means floatingly mounting said internal electrode on said horn, and means to maintain the body engaging portion of the periphery of said internal electrode in predetermined position relative to said horn.

7. In apparatus for side seam welding of tubular bodies having a welding horn to receive said bodies and cooperating internal and external welding wheel electrodes, means floatingly mounting said internal electrode on said horn, means to drive said internal electrode at predetermined peripheral speed, and means to maintain the body engaging portion of the periphery of said internal electrode in predetermined position relative to said horn.

8. In apparatus for side seam welding of tubular bodies having a welding horn to receive said bodies and cooperating internal and external welding wheel electrodes, means rotatably mounting said internal electrode on said horn, rollers journaled on said horn on each side of said internal electrode, said rollers being canted inwardly toward each other to engage opposite sides of said internal electrode adjacent the point of rolling contact of said internal electrode with said bodies, said rollers having rolling contact with said bodies, and a pair of rotatable guiding rings on opposite sides of said external electrode for clamping said bodies against said rollers as said bodies progress through the apparatus.

9. Apparatus according to claim 8 further including means floatingly mounting said external electrode for movement in a plane including the plane of rotation of said internal electrode, and means engaging the periphery of said external electrode to rotate the same and to apply welding force therethrough.

10. In apparatus for side seam welding of tubular bodies having a welding horn to receive said bodies and cooperating internal and external welding wheel electrodes, means floatingly mounting said internal electrode on said horn, means to maintain the body engaging portion of the periphery of said internal electrode in predetermined position relative to said horn, means floatingly mounting said external electrode for movement in a plane including the plane of rotation of said internal electrode, and means engaging the periphery of said external electrode at a point diametrically opposite the point of interengagement of the electrode with said bodies to apply welding force through said external electrode.

11. In apparatus for side seam welding of tubular bodies having a welding horn to receive said bodies and cooperating internal and external welding wheel electrodes the former of which is rotatably mounted on said horn, means to floatingly mount said external electrode for movement in a plane including the plane of rotation of said electrodes, a wheel engaging the periphery of said external electrode at a point diametrically opposite the point of interengagement of the electrodes with the bodies being welded, means to rotate said wheel, and means to apply welding force to said wheel.

CLIFFORD S. SELTZER.

REFERENCES CITED

The following references are of record in the file of this patent:

UNITED STATES PATENTS

| Number | Name | Date |
| --- | --- | --- |
| 1,661,970 | Sessions | Mar. 6, 1928 |
| 1,808,261 | Sessions | June 2, 1931 |
| 1,994,111 | Rocchi | Mar. 12, 1935 |
| 2,187,740 | Hothersall | Jan. 23, 1940 |
| 2,322,796 | Fentress | June 29, 1943 |

FOREIGN PATENTS

| Number | Country | Date |
| --- | --- | --- |
| 263,783 | Great Britain | Mar. 3, 1927 |